United States Patent
Hartikka et al.

(10) Patent No.: US 8,610,361 B2
(45) Date of Patent: Dec. 17, 2013

(54) LED TUBE AND LIGHTING FIXTURE ARRANGEMENT

(75) Inventors: Yrjö Hartikka, Pennala (FI); Jouko Kuisma, Lahti (FI)

(73) Assignee: Teknoware Oy, Lahti (FI)

( * ) Notice: Subject to any disclaimer, the term of this patent is extended or adjusted under 35 U.S.C. 154(b) by 308 days.

(21) Appl. No.: 13/092,172

(22) Filed: Apr. 22, 2011

(65) Prior Publication Data

US 2011/0260622 A1 Oct. 27, 2011

(30) Foreign Application Priority Data

Apr. 23, 2010 (FI) .................................. 20105448

(51) Int. Cl.
*H05B 37/02* (2006.01)

(52) U.S. Cl.
USPC ............ 315/186; 315/210; 315/294; 315/320

(58) Field of Classification Search
USPC ......... 315/186, 210, 294, 193, 295, 297, 299, 315/301, 307, 320
See application file for complete search history.

(56) References Cited

U.S. PATENT DOCUMENTS

| | | | |
|---|---|---|---|
| 7,441,922 B2 | 10/2008 | Huang et al. | |
| 7,611,260 B1 | 11/2009 | Lin et al. | |
| 8,314,564 B2 * | 11/2012 | Yu et al. | 315/185 R |
| 2006/0193131 A1 | 8/2006 | McGrath et al. | |
| 2007/0183156 A1 | 8/2007 | Shan | |
| 2007/0223225 A1* | 9/2007 | Eiich et al. | 362/260 |
| 2010/0002439 A1 | 1/2010 | Lin et al. | |

FOREIGN PATENT DOCUMENTS

| | | |
|---|---|---|
| AU | 2009101044 A4 | 11/2009 |
| CN | 101737664 A | 6/2010 |
| EP | 1 852 648 A1 | 11/2007 |
| EP | 2 151 620 A1 | 2/2010 |
| FI | 64487 | 7/1983 |
| GB | 2465966 A | 6/2010 |
| KR | 10-0821975 B1 | 4/2008 |
| WO | WO 2009/067074 A1 | 5/2009 |
| WO | WO 2009/131340 A2 | 10/2009 |

* cited by examiner

*Primary Examiner* — Daniel D Chang
(74) *Attorney, Agent, or Firm* — Birch, Stewart, Kolasch & Birch, LLP

(57) ABSTRACT

A LED tube includes a substantially fluorescent-tube-shaped and fluorescent-tube-sized translucent or fluorescent tube having one or more LED components and a current control unit installed therein. Both ends of the LED tube are provided with a pair of contact pins for connecting the LED tube mechanically and electrically to the tube holders of the fluorescent tube lighting fixture. The tube has a safety unit arranged to prevent a voltage from transferring through the tube from its one end to the other until a voltage supplied from the corresponding tube holder of the lighting fixture to the pair of contact pins has been detected at each end of the tube separately. Electric power or switching control of electric power is cross-connected between the ends of the LED tube.

14 Claims, 5 Drawing Sheets

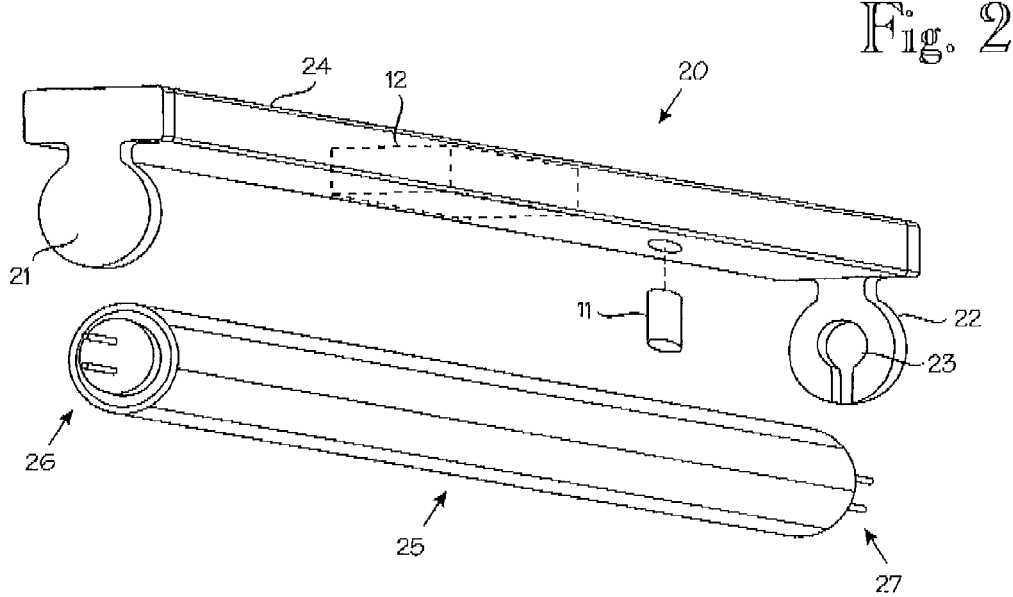
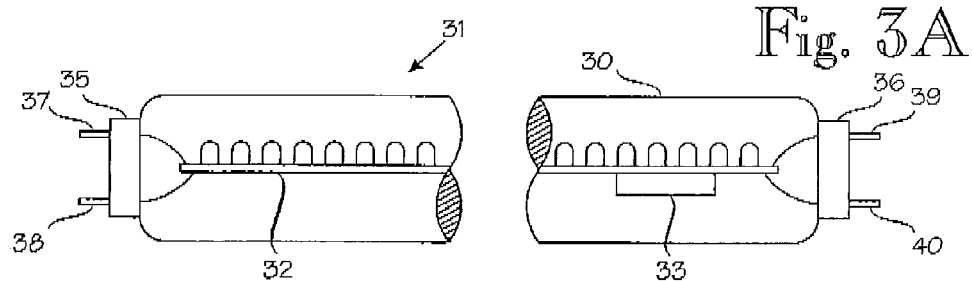
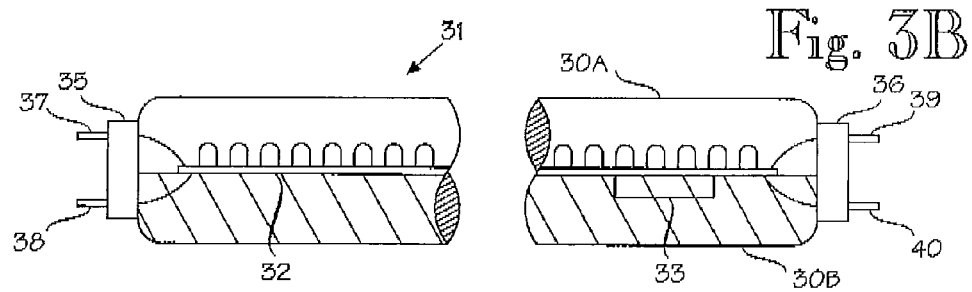
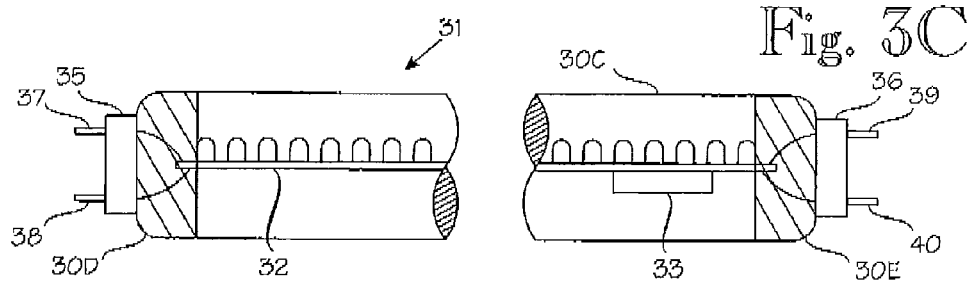

LED TUBE AND LIGHTING FIXTURE ARRANGEMENT

BACKGROUND OF THE INVENTION

The invention relates to lamps and, in particular, to LED tube lamps which have one or more LEDs as light sources and which can replace a fluorescent tube.

Fluorescent lamps are widely used in different environments, such as in homes, offices and industry. Fluorescent lamps are more durable, economical and efficient than incandescent lamps, in which most of the electric power generates heat rather than light. In a conventional fluorescent lamp, the body is a straight tube with a length of 15 to 60 times the diameter of the tube. The tube may also be bent, in which case it may be of almost any shape. Fluorescent tubes are low-pressure mercury discharge lamps in which the inner surface of the tube is coated with a fluorescent material. The structure of a fluorescent tube is very simple and is illustrated in FIG. 1A. The lamp consists of an airtight glass tube 4 containing a small amount of mercury, an inert gas, a fluorescent coating (luminophor), such as phosphor, as well as electrodes 2 and 3 (filaments). At each end of the fluorescent tube, there is a cap 5 or 6 with two symmetrically positioned contact pins 7 and 8 or 9 and 10, to which the electrode 2 or 3 is connected. The power supply to the fluorescent tube is provided via these contact pins 7 and 8; 9 and 10. When the lamp is in operation, the temperature of the electrodes 2 and 3 must be sufficiently high in order to enable electrons to be released from them. A fluorescent lamp does not go on at a normal operating voltage without preheating. It is typical of fluorescent tubes (EN 60081) that their cathodes are heated with separate preheat circuits or arrangements. On the other hand, after the lamp has gone on, the discharging current through the tube must be restricted, so that the tube will not be damaged. Therefore, all fluorescent tubes require a ballast. Conventionally, the ballast has been a ballast-starter combination, which is illustrated in FIG. 1B. When a mains voltage (e.g. 230 VAC) is connected to the lighting fixture, the resistance through the tube is very high, and the electric current passes through a ballast L, the electrode 3, a closed starter 11 and the electrode 2. When passing through the electrodes 2 and 3, the electric current heats the electrodes, causing them to emit electrons which ionize the gas inside the tube. The ionized gas forms a current path through the tube. The current passing through the ballast L generates a magnetic field in the ballast. When, after a moment, the starter 11 opens, the magnetic field of the ballast L generates a high voltage between the electrodes 2 and 3, which switches the lamp on.

Nowadays, electronic ballasts are also used. The electronic ballast also attends to switching the lamp on, so there is no need for a separate starter. A preheating arrangement is implemented by either separate pre-heating windings or a starter capacitor. This is illustrated in FIG. 1C. An electronic ballast 12 connected to the mains voltage (e.g. 230 VAC) provides continuous electric current through each of the electrodes 2 and 3. These electric currents are configured in such a way that a voltage difference is generated between the electrodes 2 and 3. When the mains voltage is connected to the ballast 12, the electric current passing through the electrodes heats them quickly, and the emitted electrons ionize the gas in the tube. The gas having ionized, the voltage difference between the electrodes starts a gas discharge.

A common aim is to replace fluorescent tubes with LED tubes having the same length and values. Their physical dimensions are the same as those of straight fluorescent tubes (e.g. T8 with a diameter of 26 mm and a length of 60 or 120 cm), whereby the fluorescent tube could be directly replaced with a LED tube in an existing fluorescent tube lighting fixture. Examples of LED tube lamps directly connected to the mains voltage with a ballast are disclosed in publications EP1852648 and U.S. Pat. No. 7,441,922. Examples of LED tube lamps provided with an electronic ballast are disclosed in publications FI64487 and US2007/0183156. Here, the electronic ballast usually supplies a high-frequency (20 kHz . . . 100 kHz) voltage to the fluorescent tube pins, and the control electronics of the LEDs carry out rectification and current limiting for the LEDs to the appropriate extent. Other examples of LED tube lighting fixtures are disclosed in publications US2010/0002439 and WO2009/131340. The aim is to achieve a long lifetime for the light source as well improved luminous efficiency (quantity of light/electric power).

In practice, the intention is to replace a fluorescent tube with a LED tube without changing structures of the lighting fixture. Some of the LED tubes work directly with a fluorescent tube ballast, in which case only the starter is to be removed from service. Then, the LED tube can be replaced easily and without assistance from an expert.

This causes a few problems, the most significant of which is a risk of an electric shock when the LED tube is being installed. FIG. 2 shows a simplified conceptual drawing of a fluorescent tube lighting fixture 20 comprising a body 24 containing the required electric structures, such as the ballast 12 and the starter 11, which is usually required only in connection with a ballast. At the ends of the lighting fixture, there are tube holders 21 and 22 with contact sockets 23 into which contact pins of ends 26 and 27 of a tube 25 are inserted to achieve mechanical and electric connection. According to the safety regulations in the field of electricity, lighting fixtures are to be constructed in such a way that when a fluorescent tube is replaced, it is impossible for a user to come into contact with any parts at the mains voltage even if the lighting fixture were connected to the mains voltage. This requirement is met even if the fluorescent tube were replaced in such a way that only one end 27 of the tube 25 is in contact with the contacts 23 of the tube holder 22 while the other end 26 of the tube may come into contact with the person replacing the tube. The requirement is met because no current is passing through the gas-filled fluorescent tube before the gas in the tube is ionized with a starting pulse. In other words, the gas in the fluorescent tube serves as an insulator in itself. The electric structure of the lighting fixture, in turn, is such that generation of a starting pulse requires that both ends of the tube be connected to the contacts of the tube holder. Thus, it has become possible to avoid a risk of an electric shock in connection with a fluorescent tube when replacing the tube.

In connection with LED tubes, this electric safety requirement is not met. Inside LED tubes, there is a printed board or the like structure on which the LEDs and the required electronic current supply components are installed. The purpose of these components is to convert the alternating voltage of the mains into direct voltage and to regulate the direct current required by the LEDs. In practice, current starts flowing through these components once voltage is applied to them, in other words the LED tube is in a conductive state without any separate starting pulse. Therefore, in practice, when the LED tube 25 is being installed in a fluorescent tube lighting fixture 20, the contact pins 27 at one end of the LED tube 25 may hit the contacts 23 of the tube holder 22, and the other end 26 of the tube may remain outside the lighting fixture so that the person installing or replacing the tube may come into contact with it, whereby he/she is subjected to the risk of an electric shock.

Another factor deteriorating electric safety is the cooling of a LED tube. Since the service life of LEDs is highly dependent on their operating temperature, various solutions have been sought for cooling the LED tube. Some solutions suggest perforation of the LED tube (e.g. U.S. Pat. No. 7,611, 260), in which case air flows through the holes, transferring heat out of the LEDs to the outside of the tube. In such a solution, owing to the plastic body of the LED tube, high insulation level of the energized parts can still be maintained.

Another cooling solution is disclosed in publications EP2151620 and US 2007/0183156, where part of the LED tube is of metal which serves as a good heat conductor, transferring heat out of the LEDs. A problem with these cooling solutions using metal is that the metal cooling part must be insulated sufficiently reliably from the LED circuits. Thus, sufficient insulation distances are required. If such LED tubes with metal cooling parts are used in such a way that they are fed by an electronic ballast, a further problem is caused by a high frequency, in particular. That is to say, the conductor circuits of the LEDs generate distributed capacitance in said metal structure, which generates a capacitive leakage current. This leakage may cause a risk of an electric shock which may even be life-threatening.

BRIEF DESCRIPTION OF THE INVENTION

An object of the invention is thus to provide a LED tube and a lighting fixture arrangement with which one or more of the above electric safety problems can be solved. The object of the invention is achieved with a LED tube and an arrangement according to the independent claims. Preferred embodiments of the invention are disclosed in the dependent claims.

An aspect of the invention is a LED tube comprising a substantially fluorescent-tube-shaped and fluorescent-tube-sized translucent or fluorescent tube having one or more LED components and a current control unit installed therein, both ends of the LED tube being provided with at least one contact pin for connecting the LED tube mechanically and electrically to the tube holders of a fluorescent tube lighting fixture. The LED tube comprises a safety unit arranged to switch electric power from the ends of the LED tube to the current control unit and/or LED components only after a voltage fed from the corresponding tube holder of the lighting fixture to said at least one contact pin has been detected at each end of the LED tube separately. The controlled electric power or the control of the switching of electric power is cross-connected between the ends of the LED tube.

An aspect of the invention is a LED tube comprising a substantially fluorescent-tube-shaped and fluorescent-tube-sized translucent or fluorescent tube, having one or more LED components and a current control unit installed therein, both ends of the LED tube being provided with at least one contact pin for connecting the LED tube mechanically and electrically to the tube holders of the fluorescent tube lighting fixture. The supply of electric power is cross-connected between the ends of the LED tube.

In accordance with an embodiment, the control of the connection of electric power is cross-connected in such a way that detection of voltage at one end of the LED tube is arranged to control electric power switching means at the opposite end.

In accordance with an embodiment, the safety unit comprises
 a first and a second controlled switching means at a first and at a second end of the LED tube, respectively, for supplying electric power to the current control unit and/or to the LED components,
 a first voltage detection means connected to detect the voltage from said at least one contact pin at the first end of the LED tube and connected to control said second switching means at the opposite end of the LED tube, and
 a second voltage detection means connected to detect the voltage from said at least one contact pin at the second end of the LED tube, and connected to control said first switching means at the opposite end of the LED tube.

In accordance with an embodiment, the safety unit comprises
 a first conductor line arranged to transfer a voltage measurement or a switching control signal from the first end of the LED tube to the opposite second end,
 a second conductor line arranged to transfer a voltage measurement or a switching control signal from the second end of the LED tube to the opposite first end.

In accordance with an embodiment, the safety unit comprises
 a first optical link arranged to transfer a voltage measurement or a switching control signal from the first end of the LED tube to the opposite second end,
 a second optical link arranged to transfer a voltage measurement or a switching control signal optically from the second end of the LED tube to the opposite first end.

In accordance with an embodiment, the electric power is cross-connected in such a way that the electric power connected from one end of the LED tube is supplied to the current control unit and/or to the LED components at the opposite end.

In accordance with an embodiment, the safety unit comprises
 a first controlled switching means arranged to switch electric power from said at least one contact pin of the LED tube at the first end of the LED tube to the current control unit and/or to the LED components, to a circuit node which is at the opposite second end of the LED tube, and
 a second controlled switching means arranged to switch electric power from said at least one contact pin of the LED tube at the second end of the LED tube to the current control unit and/or to the LED components, to a circuit note which is at the opposite first end of the LED tube.

In accordance with an embodiment, said first controlled switching means is positioned at the second end of the LED tube and connected on the supply line to receive electric power from said at least one contact pin from the opposite first end of the LED tube, whereby the voltage detection at the second end of the LED tube is arranged to control the first switching means; and said second controlled switching means is positioned at the first end of the LED tube and connected on a supply line to receive electric power from said at least one contact pin from the opposite second end of the LED tube, whereby the voltage detection at the first end of the LED tube is arranged to control the second switching means.

In accordance with an embodiment, the safety unit is arranged to detect the heating voltage received from the tube holder of the fluorescent tube to the contact pins at each end of the LED tube.

In accordance with an embodiment, the LED tube comprises two contact pins at each end of the tube, and between the two contact pins at each end of the LED tube, a resistive, inductive and/or capacitive measuring component is connected to generate a current path between the contact pins, and the safety unit is arranged to detect the low voltage over said measuring component at each end of the LED tube, the low voltage resulting from a current which passes through the measuring component and is generated in the ballast-starter circuit in the fluorescent tube lighting fixture by a high-resistance component connected in place of or in parallel with a starter.

In accordance with an embodiment, said detected voltages, heating voltages or low voltages are directly connected to serve as control voltages of the switching means.

In accordance with an embodiment, a part of the tube casing of the LED tube lighting fixture is made of metal or comprises a metal structure for providing cooling.

Another aspect of the invention is a lighting fixture arrangement which comprises a lighting fixture designed for a fluorescent tube and in which a LED tube according to an embodiment of the invention is installed.

By means of the embodiments of the invention, a situation is avoided where only one end of the LED tube is connected to the energized parts of the lighting fixture and where the person installing the tube may receive an electric shock through the LED tube from the end not installed yet.

The control or the cross-connection of electric power according to the invention prevents voltage from being connected to the LED circuitry during the installation work before both ends of the LED tube have been installed in the lighting fixture and have become energized. An energized LED circuitry, particularly when implemented on a circuit board, generates significant distributed capacitance and leakage current to the metal parts or the body of the tube. This distributed capacitance may be relatively high because the tube itself is thin and does not structurally allow great distances between the conductors and the body. The leakage current, in turn, may cause a risk of an electric shock when the LED tube is being installed. If the detection of voltage at one end of the tube caused connection of voltage to the LED circuitry at the same end even if the other end of the tube were not installed yet, the energized LED circuitry would cause distributed capacitance and a risk of an electric shock for the person installing the tube.

In the embodiments of the invention to which cross-connection of control is applied, detection of voltage at one ("hot") end of a LED tube results in the de-energized ("cold") end to be connected to the LED circuitry. Thus, the de-energized LED circuitry does not cause distributed capacitance or leakage current to the metal parts or body of the tube. The LED circuitry becomes energized only after both ends of the LED tube have been installed in the lighting fixture, i.e. when also the other "cold" end becomes energized ("hot"). The cross-connected control conductors cause some distributed capacitance but this is significantly lower than (a fraction of) the distributed capacitance caused by the energized LED circuitry.

In the embodiments of the invention to which cross-connection of electric power is applied, the same advantage is achieved as with cross-connection of control: detection of voltage at one ("hot") end of the LED tube results in the connection pins of the de-energized ("cold") end to be connected to the LED circuitry. The electric power of the energized ("hot") end has been applied to the (open) circuit-breaking switch of the other ("cold") end of the tube with supply lines. The LED circuitry becomes energized only after both ends of the LED tube have been installed in the lighting fixture, in other words when also the other "cold" end becomes energized, whereby 1) the circuit-breaking switch of the "hot" end also obtains electric power, and 2) the circuit-breaking switch of the "cold" end also closes. Thus, the LED circuitry is connected to the voltage simultaneously by its both ends. The cross-connected power supply conductors cause some distributed capacitance but this is significantly lower than (a fraction of) the distributed capacitance caused by the energized LED circuitry.

BRIEF DESCRIPTION OF THE FIGURES

The invention will now be described in greater detail by means of preferred embodiments with reference to the accompanying drawings, in which:

FIG. 2 shows a simplified example of the structure of a fluorescent tube lighting fixture;

FIGS. 3A, 3B and 3C show simplified examples of the mechanical structure of a LED tube;

Figure 1A:
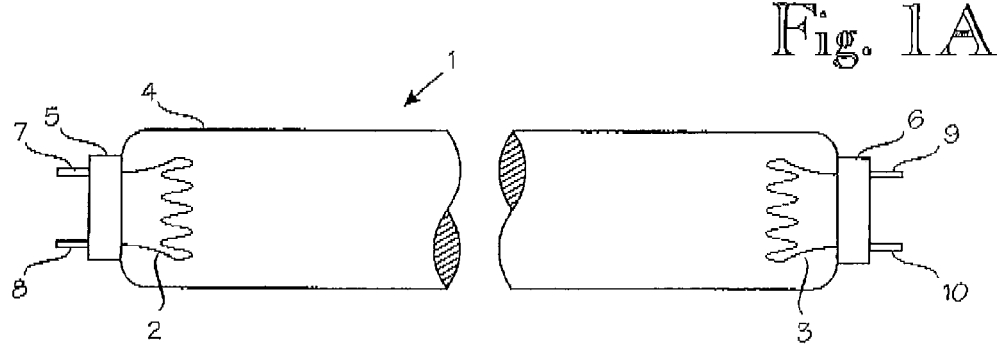
FIG. 1A shows a simplified example of the mechanical structure of a fluorescent tube.

DESCRIPTION OF EXEMPLARY
EMBODIMENTS OF THE INVENTION

The field of application of the invention encompasses all lamps, particularly tube lamps which have one or more LEDs as a light source and with which a fluorescent tube lighting fixture or the like can be replaced.

FIG. 3A illustrates a simplified example of a potential structure of a LED tube. A lamp 31 consists of a straight (or bent) tube 30 which is of an appropriate translucent material, such as glass or plastic, or possibly of a fluorescent material. The tube 30 does not have to be air-tight. On the contrary, there may be openings, holes and/or slots for providing air circulation and cooling (e.g. U.S. Pat. No. 7,011,260), whereby the air flows through these holes, transferring heat out of the LEDS to the outside of the tube. In such a solution, owing to the LED tube body made of plastic or other insulation material, high insulation level of the energized parts is still maintained.

Alternatively, part of the tube casing of the LED tube may be made of metal or may comprise a metal structure to provide cooling. Metal acts as a good heat conductor and conducts heat away from the LEDs and from the inside of the LED tube to the surrounding air. FIGS. 3B and 3C show examples of LED tubes provided with metal cooling elements. In FIG. 3B, the tube forming the casing of the LED lamp is formed of two portions 30A and 30B. The portion 30A is of an appropriate translucent material, such as glass or plastic, or possibly of a fluorescent material (in the same way as the whole tube in FIG. 3A). The portion 30A is of metal and forms a cooling element. The portions 30A and 30B in the example of FIG. 3B are tube halves symmetrical relative to the longitudinal axis of the tube and, when combined, they form a continuous cylindrical tube. The portions 30A and 30B may also be asymmetrical in a desired manner in the longitudinal direction, depending on the amount of cooling required or the size of the illuminating sector, for example. The cross-sectional profiles of the portions 30A and 30B may also deviate from each other in another way; for example, the profile of the portion 30A may be a half-circle and the profile of the portion 30B may be rectangular. It is also feasible that the portions 30A and 30B overlap slightly. Another possibility is that the tube 30 according to FIG. 3A forms the portion 30A, and the portion 30B is a separate metal element positioned as a casing over the tube 30A. In the example of FIG. 3C, the tube forming the casing of the LED lamp is formed of three tubular portions 30C, 30D and 30E. The middle portion 30C is of an appropriate translucent material, such as glass or plastic, or possibly of a fluorescent material (in the same way as the whole tube in FIG. 3A). The end portions 30D and 30E are of metal and form the cooling elements. The tube portions 30C, 30D and 30E form a full-sized cylindrical tube when connected one after the other. It is also feasible that the portions 30D and 30E overlap slightly with the portion 30C. Further, it is feasible that the tube 30 according to FIG. 3A forms the portion 30C, and the portions 30D and 30E are separate metal elements positioned as casings or end sleeves over the tube 30C. More examples of LED tubes equipped with metal cooling elements are disclosed in publications EP2151620 and US 2007/0183156.

Figure 3D:
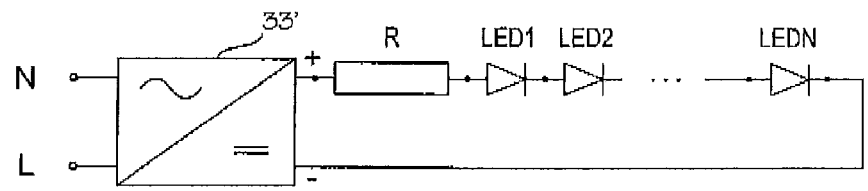
FIG. 3D is a simplified circuit diagram showing an example of the LED circuit of the LED tube of FIG. 3A and its current supply.

Inside the tube 30 (tube 30A to 30B or 30C to 30E, respectively), there is a printed board 32 or a corresponding structure, on which LED (Light Emitting Diode) components 34 and electronic current supply components 33 they require are installed. The purpose of these components 33 is to convert the alternating voltage (e.g. 230 VAC) of the mains supply network to direct voltage (dc) and to regulate the dc current required by the LEDs 34, FIG. 3D shows an example of potential LED circuit of the LED tube of FIG. 3A and its current supply. In FIG. 3D, phase voltage (L) and zero (N) of the mains are connected to a rectifier circuit 33' that generates a dc voltage. A LED chain with N LEDs in series, where N=1, 2, . . . , is connected to the dc voltage via a current-limiting series resistor R. The series resistor R shown in FIG. 3D can be replaced by an electronic (preferably low-loss) switched-mode solution.

Both ends of the tube 30 (tube 30A to 30B or 30C to 30E, respectively) are closed by a cap 35 or 36 with two symmetrically positioned contact pins 37 and 38 or 39 and 40. Power supply to the current supply components 33 on the circuit board 32 is carried out via these contact pins 37 and 38; 39 and 40. It should be noted that the internal structure and electric implementation of the LED tube are not significant to the invention but the safety solution according to the embodiments of the invention can be applied to implementations of various types. The mechanical dimensions of the LED tube, at least its length and the number, locations and dimensions of contact pins, are preferably substantially the same as those of the fluorescent tube which is to be replaced, so that the fluorescent tube can be directly replaced by a LED tube in an existing fluorescent tube lighting fixture. The LED tube 31 may be matching in dimensions with a T8 tube, for instance, the diameter of which is approximately 26 mm and the length 60 cm or 120 cm. According to an embodiment, the LED tube is intended to replace a fluorescent tube with only one contact pin at each end (single pin tube). A tube such as this may be a cold cathode fluorescent tube, for example, in which the electrode has no preheating.

As described above, if, for example, the LED tube 31 shown in FIG. 3A is installed in the lighting fixture 20 of FIG. 2, the contact pins 39 and 40 of the tube 31 may be in the tube holder's 22 contact socket 23 that has a mains voltage. Then again, the contact pins 37 and 38 of the opposite end of the tube 31 may still be outside the lighting fixture 20 and exposed to the touch of the person installing the lamp. A dangerous voltage may pass from the contact pins 39 and 40 of the structures, such as circuit board 32, LEDs 34 and/or current supply components 33, inside the tube 30 (tube 30A to 30B or 30C to 30E, respectively) to the contact pins 37 and 38.

Also, if the tube casing of the LED tube has a metal structure for providing cooling (as is the case in the examples of FIGS. 3B and 3C), a problem arises from the fact that metal is also a conductor of electricity, whereby the metal, touchable outer parts of the tube increase the risk of an electric shock. Therefore, a metal cooling part needs to be isolated sufficiently reliably from the LED circuits. Sufficient insulation distances are then required. If such LED tubes with a metal cooling part are used such that they are fed by an electronic ballast, the high frequency of the fed voltage causes a further problem. That is to say, the conductor circuits of the LEDs generate distributed capacitance to the alternating voltage, especially high-frequency voltage (>1 kHz, preferably higher than 10 kHz), in said metal cooling structure, causing thus a capacitive leakage current. This leakage current may cause a risk of an electric shock which may even be life-threatening. Such capacitive leakage currents may be generated in metal structures close to the tube also in LED tubes of the type shown in the example of FIG. 3A.

Figure 4A:
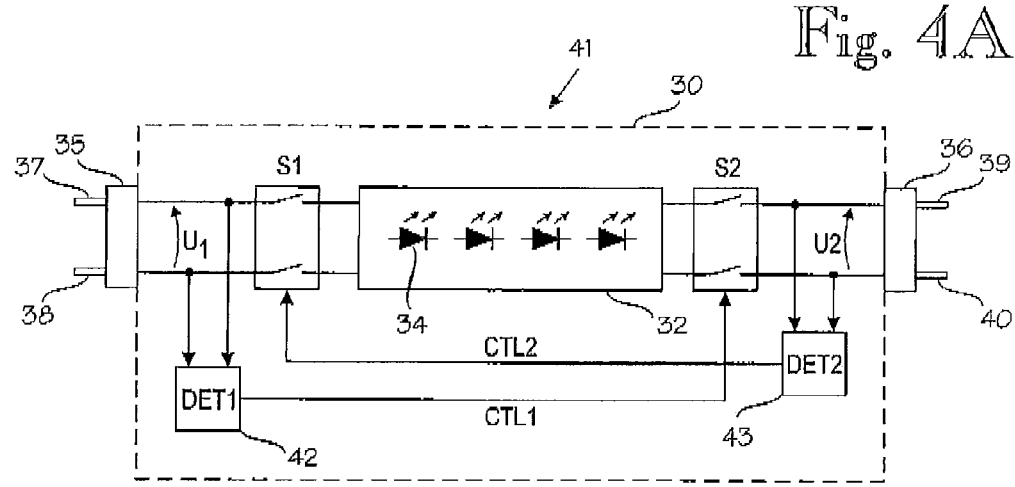
FIG. 4A shows schematically a LED tube according to an exemplary embodiment of the invention, where the power switching control is cross-connected between the ends of the LED tube.

FIG. 4A is shows schematically a LED tube 41 according to an exemplary embodiment of the invention. The LED tube 41 may be similar in mechanical and electric structure to the tube 31 of FIG. 3A, 3B or 3C, for instance, with the exception that the LED tube 41 is also equipped with a safety circuit according to an embodiment of the invention to remove the risk of an electric shock to the person doing the installation. The components of the safety circuit may preferably be positioned on the same printed board 32 or a corresponding structure as the LEDs 34 and the other current supply components 33.

As described above in connection with FIG. 1C, the electronic ballast 12 supplies the heating voltage of the electrodes via two conductors directly to both ends of the fluorescent tube 1, more specifically to the contact pins 7, 8, 9 and 10 at these ends. The operating voltage of the fluorescent tube 1 is formed between these heating voltages, whereby the heating voltages are of a different potential. If the lighting fixture 20 of FIG. 2 contains such an electronic ballast (in which case it does not contain a starter 11), these heating voltages are also available at the contact sockets 23 of the tube holders 21 and 22.

Some embodiments of the invention utilize these directly supplied, low heating voltages as detection voltages of the safety circuit. In the example of FIG. 4A, voltage detectors (DET1) 42 and (DET2) 43 are arranged inside the LED tube 41. The voltage detector 42 is connected to detect (measure) heating voltage U1 between the contact pins 37 and 38 at the first end of the LED tube 41. The voltage detector 42 activates a control signal CTL1 when the heating voltage U1 is detected. Correspondingly, the voltage detector 43 is connected to measure heating voltage U2 between the contact pins 39 and 40 at the other end of the LED tube 41. The voltage detector 43 activates a control signal CTL2 when the heating voltage U2 is detected. Further, a circuit-breaking switch S1 is added to one end inside the LED tube 30 (tubes 30A to 30B or 30C to 30E, respectively) in connection with the current supply circuit of the LED tube 41, a circuit-breaking switch S2 being added to the other end. These switches open (break) or close (connect) the current circuit of the LED tube lighting fixture, controlled by the control signals CTL and CTL2, and thereby prevent or allow transfer of a dangerous voltage through the tube from its one end to the other. The circuit-breaking switches S1 and S2 are open when the tube 41 has not been installed in the lighting fixture, i.e. when neither of the voltage detectors 42 and 43 detects heating voltage U1 and U2, respectively. One of the circuit-breaking switches S1 and S2 is open and the other one closed when only one end of the LED tube 41 is installed in the contact socket of the lighting fixture, i.e. when only one of the voltage detectors 42 and 43 detects heating voltage U1 or U2, respectively. In this case, the open circuit-breaking switch prevents the uninstalled end from becoming energized. Both circuit-breaking switches S1 and S2 close only if both ends of the LED tube 41 are installed correctly in the tube holders of the lighting fixture and both voltage detectors 42 and 43 detect heating voltage U1 and U2, respectively, arriving from the lighting fixture. This prevents a situation where only one end of the LED tube 41 is connected to the energized parts of the lighting fixture and where the person installing the LED tube may receive an electric shock through the LED tube.

In the example of FIG. 4A, controls of the circuit-breaking switches S1 and S2 are cross-connected between the ends of the LED tube 41 such that detection of the voltage U1 at the end of the LED tube 41 where the circuit-breaking switch S1 is positioned is arranged to control the electric power circuit-breaking switch S2 at the opposite end, and detection of the voltage U2 at the end of the LED tube 41 where the circuit-breaking switch S2 is positioned is arranged to control the electric power circuit-breaking switch S1 at the opposite end. In other words, the control signals CTL1 and CTL2 are taken to the circuit-breaking switches S2 and S1. Thus, voltage detection at one ("hot") end of the LED tube causes connection of the de-energized ("cold") end to the LED circuitry. The de-energized LED circuitry does not cause distributed capacitance or leakage current to the metal parts or body of the tube. The LED circuitry becomes energized only after both ends of the LED tube have been mounted on the lighting fixture, i.e. when the other, "cold" end also becomes energized ("hot"). This reduces capacitive leakage currents into metal cooling structures, for example, such as to the tube portions 30B, 30D and 30E in FIGS. 3B and 3C.

Figure 4B:
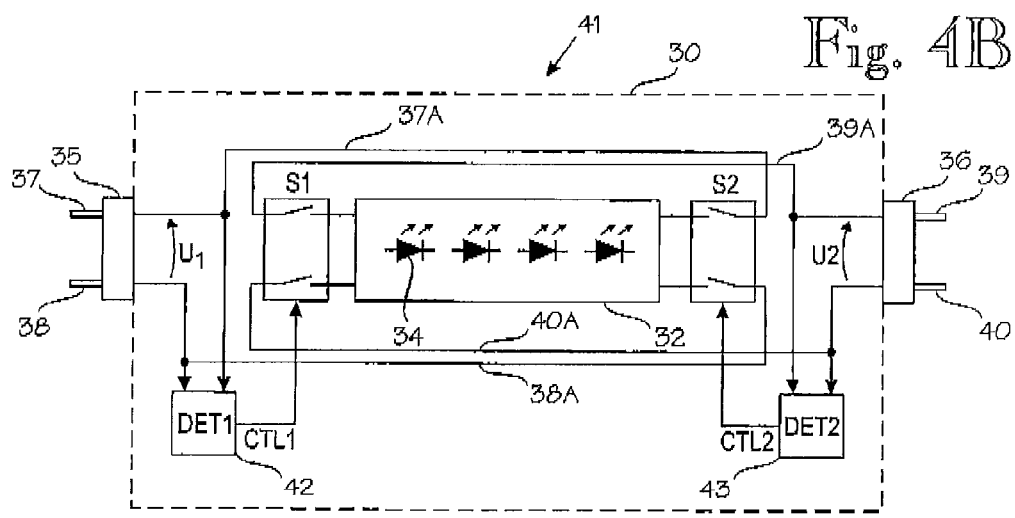
FIG. 4B shows schematically a LED tube according to an exemplary embodiment of the invention, where the power supply is cross-connected between the ends of the LED tube.

FIG. 4B shows schematically a LED tube according to an exemplary embodiment of the invention, similar to the one in the example of FIG. 4A, except that now the power supply instead of the control is cross-connected between the ends of the LED tube. In FIGS. 4A and 4B, the same reference numerals denote substantially the same elements and functions with the exception of the following differences. In the example of FIG. 4B, detection of the voltage U1 is arranged to control the electric power circuit-breaking switch S1 or S2 at the same end of the LED tube 41. The measuring or control lines CTL1 and CTL2 do not, therefore, lead from one end of the LED tube to the other but the control signal CTL1 controls the circuit-breaking switch S1 while the control signal CTL2 controls the circuit-breaking switch S2. Instead, the electric power supply is cross-connected in such a way that the electric power received from one end of the LED tube 41 is supplied to the current control unit and/or to the LED components at the opposite end. In other words, the contact pins 37 and 38 are connected with supply lines 37A and 38A to the circuit-breaking switch S2 at the opposite end of the LED tube 41, and the switch S2 connects, controlled by the signal CTL2, electric power (supply voltage) to the connection point at this end of the LED circuit 32. Correspondingly, the contact pins 39 and 40 are connected with supply lines 39A and 40A to the circuit-breaking switch S1 at the opposite end of the LED tube 41, and the switch S1 connects, controlled by the signal CTL1, electric power (supply voltage) to the connection point at this end of the LED circuit 32. Thus, voltage detection at one ("hot") end of the LED tube causes the contact pins of the de-energized ("cold") end to be connected to the LED circuitry. The LED circuitry becomes energized only after both ends of the LED tube have been installed in the lighting fixture, i.e. when the other, "cold" end also becomes energized. Thus, the LED circuitry is connected to the voltage simultaneously by its both ends.

Figure 1B:
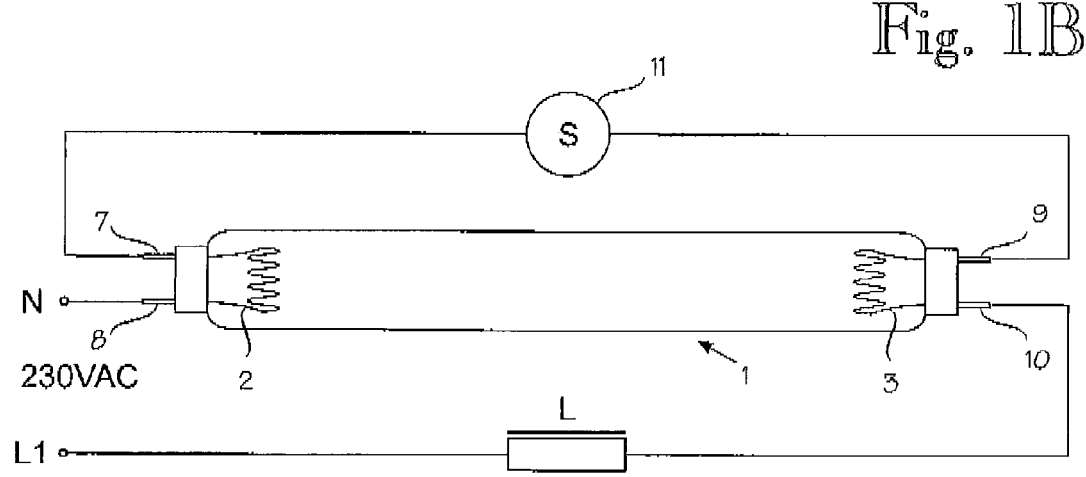
FIG. 1B shows an example of the electric circuitry of a fluorescent tube when the ballast is implemented with a ballast-starter combination.
Figure 1C:
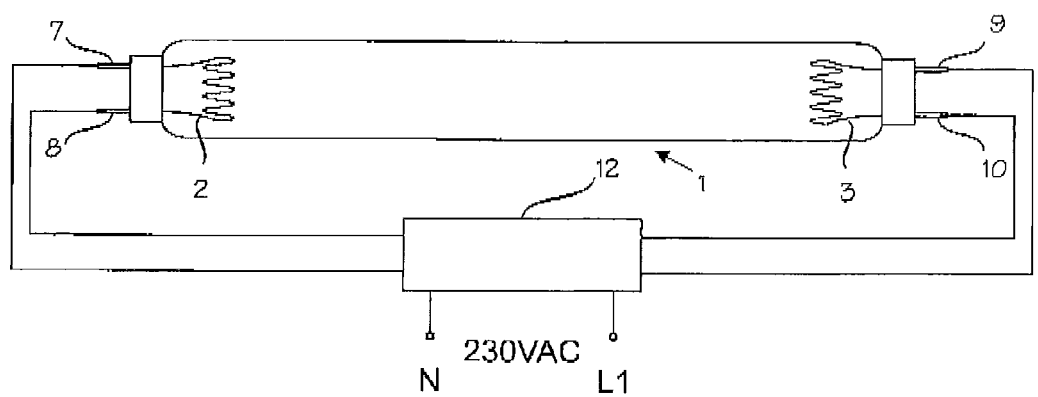
FIG. 1C shows an example of the electric circuitry of a fluorescent tube when an electronic ballast is used.

Conventional ballast-starter circuits do not have separate heating voltages and the preheating of the fluorescent tube is achieved by a momentary current pulse of the ballast-starter circuit, as described in connection with FIG. 1B. In a fluorescent tube lighting fixture that uses such a ballast-starter circuit, there are no separate heating voltages for the contact pins 37, 38, 39 and 40 at each end of the LED tube 41 but the supply voltage of the lighting fixture to the contact pins 37, 38, 39 and 40 at each end arrives through the ballast 12. In such a lighting fixture, the detection circuits 42 and 43 of the LED tube 41 according to FIGS. 4A and 4B should detect (measure) mains voltage or some other supply voltage high-ohmically in the contact pins at the different ends of the LED tube. This means that a risk of an electric shock may arise through the detector circuit when one end of the LED tube 41 is connected to the contact socket 23 of the lighting fixture but the other end is not. This is the case despite the fact that in the tube lighting fixture of the embodiment of FIG. 4, the circuit-breaking switches S1 and S2 of the safety circuit are open and no supply voltage is supplied to the circuit board 32 through them.

Figure 5A:
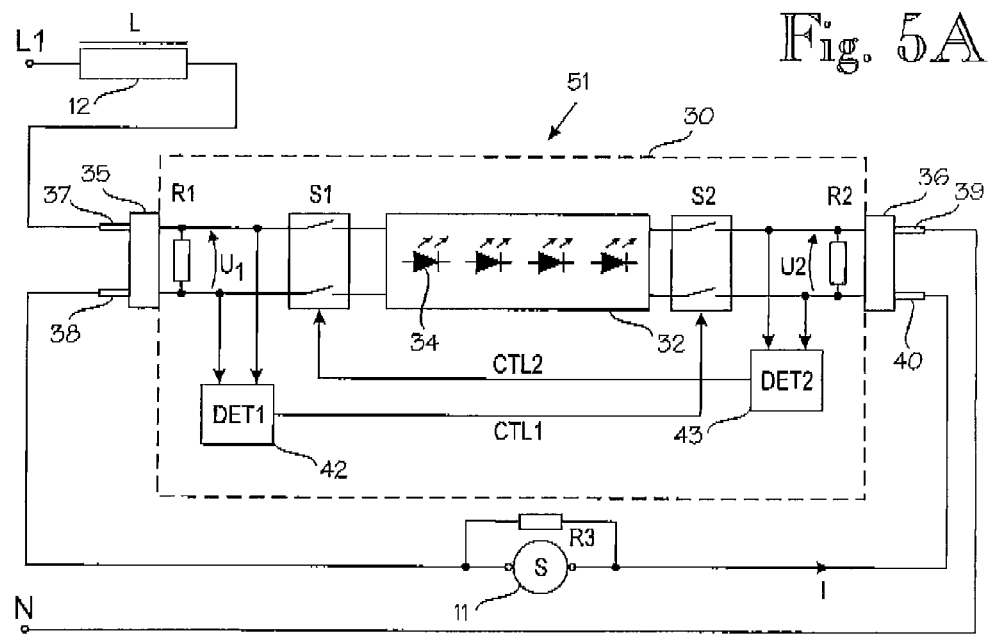
FIG. 5A shows schematically a LED tube according to yet an exemplary embodiment of the invention, where the power switching control is cross-connected between the ends of the LED tube, as well as a circuit arrangement installed in a fluorescent tube lighting fixture provided with a ballast-starter combination.
Figure 5C:
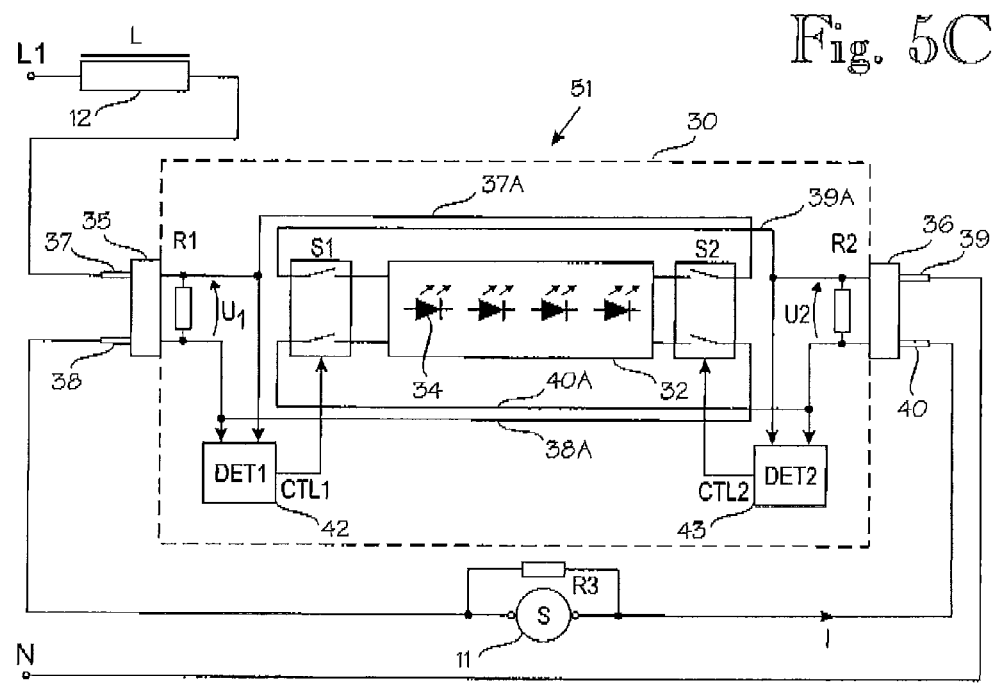
FIG. 5C shows schematically a LED tube according to yet an exemplary embodiment of the invention, where the power supply is cross-connected between the ends of the LED tube, as well as a circuit arrangement installed in a fluorescent tube lighting fixture provided with a ballast-starter combination.

FIG. 5A is shows schematically a LED tube 51 according to another exemplary embodiment of the invention as well as a circuit arrangement installed in a fluorescent tube lighting fixture provided with a ballast-starter combination, such as in the lighting fixture 20 in FIG. 2. The LED tube 51 may be similar in mechanical and electric structure to the tube 31 of FIG. 3A, 3B or 3C, for instance, with the exception that the LED tube 51 is, in addition, equipped with a safety circuit according to an embodiment of the invention to remove the risk of an electric shock to the person doing the installation. The components of the safety circuit may preferably be positioned on the same printed board 32 or a corresponding structure as the LEDs 34 and the other current supply components 33. It should be noted that FIG. 5A shows the contact pins (37, 38, 39 and 40) and the lighting fixture conductors connected to them schematically. In practice, conductors are connected to the contact pins of the lamp through the contact sockets 23 in the tube holders 21 and 22 according to FIG. 2.

Figure 5B:
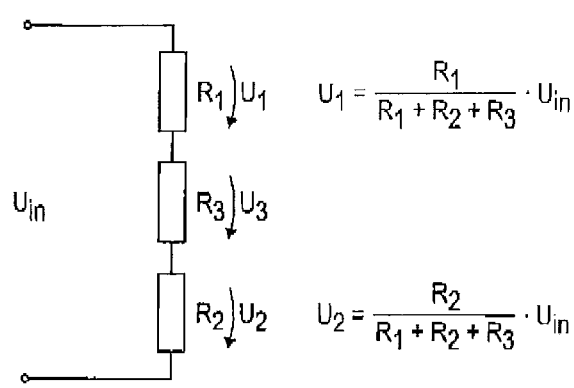
FIG. 5B shows an example of the dimensioning of resistors R1, R2 and R3 of FIG. 5A.

The LED tube 51 of FIG. 5A may be substantially similar to the LED tube 41 of the exemplary embodiment of FIG. 4A, and in FIGS. 4A and 5A the same reference numbers indicate substantially the same elements and functions, except that between the contact pins 37 and 38 in the LED tube 51a, a component R1 is connected which replaces the heating filament of the fluorescent tube electrode and through which a current I can pass. Correspondingly, between the contact pins 39 and 40 at the other end of the LED tube 51, a component R2 is connected which replaces the heating filament of the fluorescent tube electrode and through which a current I can pass. The components R1 and R2 are for instance resistors, capacitors, inductances or other corresponding components, or various combinations of these. In the circuit arrangement, the starter of the lighting fixture 20 has been removed and replaced by a component R3 having high resistance, whereby a low current I caused by the mains voltage passes through it. Alternatively, the component R3 may be positioned in parallel with the starter, as illustrated in FIG. 5A. The component R3 may be for instance a resistor, capacitor, inductance or some other corresponding component, or a combination of these. The component R3 may be implemented by a housing and connectors corresponding in physical size to the starter 11 and, therefore, the component R3 can be positioned in the socket of the starter 11 in the lighting fixture 20. The values of these components R1, R2, and R3 are preferably dimensioned to be high-ohmic in such a manner that the current I passing through them is very essentially lower than the heating current of the fluorescent tube would be. FIG. 5B shows an example of the dimensioning of the components R1, R2, and R3 when the components are resistors. The resistors R1, R2 and R3 are connected in series between a supply voltage Uin (e.g. in FIG. 5A between phase voltage L1 and zero N). A voltage U1 (measured in FIG. 5A) is generated over the resistor R1, and voltage U2 (also measured in FIG. 5A) is generated over the resistor R2. A voltage U3 is generated over the resistor R3. The values of voltages U1 and U2 can be determined by means of the equations of FIG. 5B. The resistances of the resistors R1, R2, and R3 can be selected to obtain the required voltages U1 and U2 at a given supply voltage Uin. As is obvious to those skilled in the art, R1, R2, and R3 shown in the equations can be replaced by symbols Z1, Z2 and Z3 when the components contain inductance and/or capacitance instead of or in addition to resistance.

This arrangement creates a situation where between the contacts 37 and 38 as well as 39 and 40, respectively, at each end of the LED tube 51 (over the component R1 and R2, respectively), a low voltage U1 and U2, respectively, is generated and can be used as detection voltage. The voltage detectors 42 and 43 detect the voltages U1 and U2 in the same way as they detect heating voltages, and they control the circuit-breaking switches S1 and S2 with the control signals CTL1 and CTL2 in the same way as in the embodiment of FIG. 4A, for example. In this way, the LED tube 41 can be kept completely open (non-conducting) until the voltage detectors 42 and 43 have verified from the voltages U1 and U2 that the tube 41 has been reliably installed in its tube holders 21 and 22 in the lighting fixture 20. Cross-connection of control reduces capacitive leakage currents into adjacent metal structures.

FIG. 5B shows schematically a LED tube according to an exemplary embodiment of the invention, similar to the one in the example of FIG. 5A, except that now, instead of the control, the power supply is cross-connected between the ends of the LED tube. This cross-connection of the power supply may be substantially similar to that in the example of FIG. 4B. In FIGS. 4B and 5B, the same reference numbers indicate substantially the same elements and functions.

The LED fluorescent tube 51 with the components R1 and R2 is also suitable for use with an electronic ballast that generates heating voltages directly. The high-resistance component R1 or R2 does not cause significant loss current from the low heating voltage. In some embodiments of the invention, the components R1 and R2 are both in series with at least one switch with which the components R1 and R2 can be connected and disconnected between the contact pins, whereby the LED tube can be installed in accordance with the tube 51 or the tube 41, depending on the installation. The user can select switch positions by using actuators on the caps 35 and 36.

According to yet some embodiments, the LED tube is intended to replace a fluorescent tube with only one contact pin at each end (single pin tube). A tube such as this may be a cold cathode fluorescent tube, for example, in which the electrode has no preheating. For instance, the single pin version of the LED tube in FIG. 3A could only have contact pins 37 and 38. The safety unit of the invention can also be applied to this type of single pin LED tube. Then, for instance, the contact pins 38 and 40 and their connections may be left out of the LED tube of FIG. 4. The voltage detectors 42 and 43 may monitor the voltages of the contact pins 37 and 39 and close both circuit-breaking switches S1 and S2 only if both detect a voltage.

In all embodiments of the invention, the circuit-breaking switch S1 or S2 may be implemented with any switch structure or component that is capable of breaking a mains voltage circuit. The circuit breaking preferably takes place bipolarly, as shown in the examples of FIGS. 4A to 4B and 5A to 5C. Examples of suitable circuit-breaking switches are electromechanical switches, such as relays, and semiconductor switches, such as transistors. In the examples of FIGS. 4A to 4B and 5A to 5C, the circuit-breaking switches S1 and S2 are connected between the contact pins 37 to 40 and the rest of the LED circuitry 32 on the circuit board 32, whereby they naturally efficiently prevent a dangerous voltage from passing from one end of the LED tube 41 or 51 to the other. However, the circuit-breaking switches S1 and S2 may reside at any point of the LED circuitry as long as they break the current path in a way that prevents a dangerous voltage from passing from one end of the LED tube 41 or 51 to the other. However, with regard to the advantage obtained from cross-connection of the control or power supply, i.e., reducing the capacitive leakage current, the closer the circuit-breaking switches S1 and S2 are positioned to the ends of the LED tube lighting fixture, the more advantage is achieved. Here, the circuit-breaking switches are said to be at the end of the LED tube when they are positioned in the tube portion closer to the end of the tube than to its middle point.

The voltage detector 42 or 43 may be implemented by using any circuit solution which in the presence of a sufficient heating voltage U1 or U2, respectively, generates a control signal CTL1 or CTL2, respectively, such as a control voltage. The voltage detector 42 or 43 may be a relay or a voltage comparator, for example, which obtains also its operating voltage from the heating voltage U1 or U2. Thus, it may also be a part of the switch S1. The control through the LED tube may then be a measuring signal, such as a voltage U1 or U2.

Figure 6A:
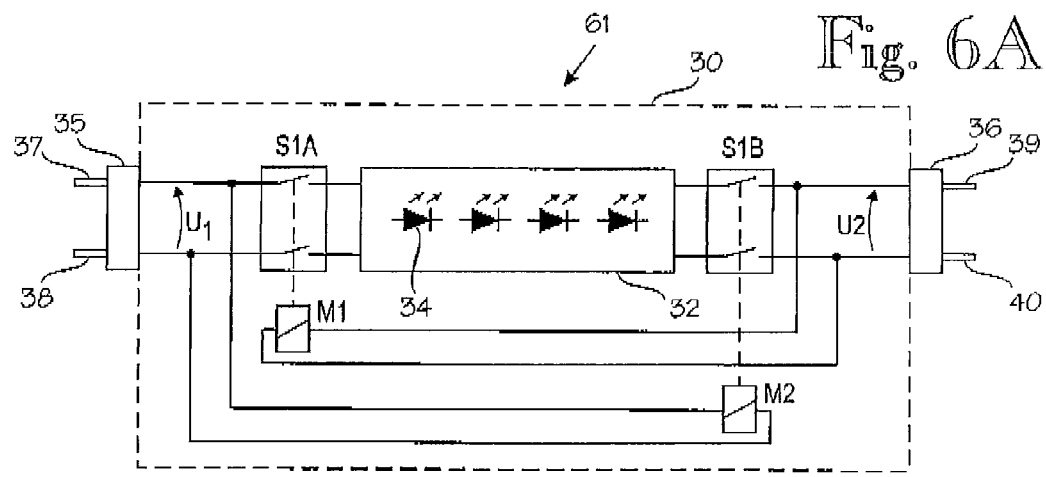
FIG. 6A shows schematically a LED tube according to yet an exemplary embodiment of the invention, where the circuit-breaking switches are implemented with relays which are directly controlled by heating voltages cross-connected between the ends of the LED tube.
Figure 6B:
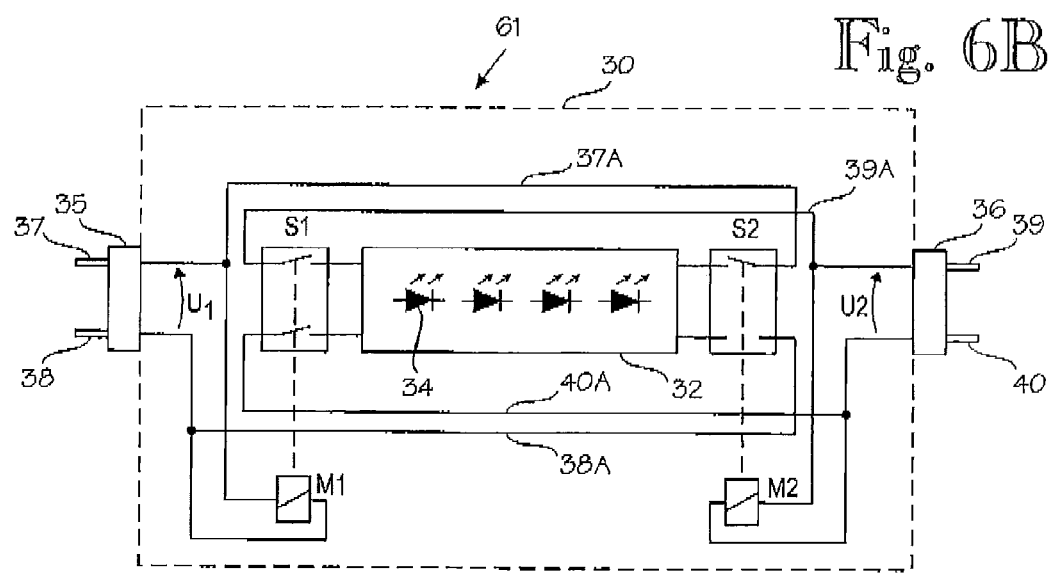
FIG. 6B shows schematically a LED tube according to yet an exemplary embodiment of the invention, where the circuit-breaking switches are implemented with relays directly controlled by heating voltages and where the power supply is cross-connected between the ends of the LED tube.

FIGS. 6A and 6B show schematically LED tubes 61 according to yet some exemplary embodiments of the invention, where the circuit-breaking switches S1 and S2 are implemented with relays obtaining their operating voltage from the heating circuits of the LED tube 61. In the example of FIG. 6A, the controls of the circuit-breaking switches S1 and S2 are cross-connected between the ends of the LED tube 61. In other words, the heating voltage U1 between the contact pins 37 and 38 is connected in parallel with a control coil M2 of the relay S2 and, correspondingly, the heating voltage U2 between the contact pins 39 and 40 is connected in parallel with a control coil M2 of the relay S2. Thus, the control coils M1 and M2 of the relays directly form the voltage detectors 42 and 43 according to FIG. 4A. When there is a heating voltage U1 between the contact pins 37 and 38, the control coil M2 pulls the contacts of the relay S2 from an open position into a closed position. Correspondingly, when there is a heating voltage U2 between the contact pins 39 and 40, the control coil M1 pulls the contacts of the relay S2 from an open position into a closed position. Both relays S1 and S2 close (the current path is connected) only if both ends of the LED tube 61 have been installed correctly in the tube holders and both control coils M1 and M2 receive the heating voltage U2 and U1, respectively, from the lighting fixture. In this way, a situation is avoided where only one end of the LED tube 61 is connected to the energized parts of the lighting fixture and where the person installing the LED tube may receive an electric shock through the LED tube. Cross-connection of control reduces capacitive leakage currents into adjacent metal structures.

The LED tube 61 according to the example of FIG. 6B is similar to the one in the example of FIG. 6A, except that now, instead of the control, the power supply is cross-connected between the ends of the LED tube. This cross-connection may be implemented with the principle of the example of FIG. 4B such that the electric power received from one end of the LED tube 61 is supplied to the current control unit and/or to the LED components at the opposite end. In other words, the contact pins 37 and 38 are connected with supply lines 37A and 38A to the relay S2 at the opposite end of the LED tube 61, and the relay S2 connects, controlled by the control coil M2 and the heating voltage U2, electric power (supply voltage) to the connection point at this end of the LED circuit 32. Correspondingly, the contact pins 39 and 40 are connected with supply lines 39A and 40A to the circuit-breaking switch S1 at the opposite end of the LED tube 61, and the switch S1 connects, controlled by the control coil M1 and the heating voltage U1, electric power (supply voltage) to the connection point at this end of the LED circuit 32. In the example of FIG. 6B, detection of the voltage U1 or U2 is arranged to control the relay S1 or S2 at the same end of the LED tube 41. Heating voltages U1 and U2 are thus not led from one end of the LED tube to the other, whereby they do not cause distributed capacitance. Cross-connection of the power supply, in turn, reduces the distributed capacitance and leakage current caused by the LED circuit itself.

The embodiments of FIGS. 5A and 5B are particularly well applicable to electronic ballasts with separate heating voltage supplies. More generally, this embodiment may be applied by using, instead of a relay or relays, any circuit-breaking switch, for instance a semi-conductor relay, for which the detected voltages, heating voltages or low voltages are directly connected to serve as control voltages. Direct connecting may also include the use of a driver circuit or circuits of a switch.

The various embodiments of the invention may also be provided with a memory or hold feature which keeps the switches S1 and S2 closed even if, after the lamp has gone on, the heating voltage U1 or U2 arriving at the contact pins 37, 38, 39 and 40 becomes lower or non-existent but the power supply (tube voltage) remains. If the tube voltage is also removed from the contact pins 37 to 40, for example when a LED tube is being detached from a lighting fixture, or the lighting fixture is turned off, the switches S1 and S2 also open and the LED tube returns to its initial state. Reclosing the switches S1 and S2 again requires heating voltages at both ends of the tube. This exemplary embodiment is particularly well applicable to electronic ballasts with an advanced heating supply circuit, such as preheating, and possibly lowering or disconnecting of heating voltages after the turning-on process. In this exemplary embodiment, it is ensured that even if the operation of the electronic ballast is such that the heating voltage is disconnected after the tube has been turned on, the operation still continues until the actual supply voltage is connected to the tube.

In the embodiments of the invention, transfer of a control signal, for example CTL1 and CTL2, from one end of the LED tube to another may alternatively be implemented with an optical transmission link, such as an optical transmitter and receiver as well as an optical fibre between them, or by isolating the control line from the energized end with an opto-isolator or the like component. In this way, the distributed capacitance and leakage current caused by control or measuring signals are avoided or at least reduced.

It will be obvious to a person skilled in the art that, as technology advances, the basic idea of the invention may be implemented in many different ways. The invention and its embodiments are thus not restricted to the examples described above, but may vary within the scope and spirit of the claims.

The invention claimed is:

1. A LED tube, comprising:
   a substantially fluorescent-tube-shaped and fluorescent-tube-sized translucent or fluorescent tube having one or more LED components and a current control unit installed therein, both ends of the LED tube being provided with at least one contact pin for connecting the LED tube mechanically and electrically to tube holders of a fluorescent tube lighting fixture; and
   a safety unit arranged to switch electric power from the ends of the LED tube to the current control unit and the one or more LED components separately only after a voltage fed from the corresponding tube holder of the lighting fixture to said at least one contact pin has been detected at each end of the LED tube separately, and the supply of electric power or the control of the switching of electric power is cross-connected between the ends of the LED tube,
   wherein the safety unit comprises:
   a first and a second controlled switching device at a first and at a second end of the LED tube, respectively, configured to supply electric power to the current control unit and to the one or more LED components;
   a first voltage detector connected to detect the voltage from said at least one contact pin at the first end of the LED tube, and connected to control said second switching device at the opposite second end of the LED tube; and
   a second voltage detector connected to detect the voltage from said at least one contact pin at the second end of the LED tube, and connected to control said first switching device at the opposite first end of the LED tube.

2. The LED tube as claimed in claim 1, wherein the control of the connection of electric power is cross-connected in such a way that detection of voltage at one end of the LED tube is arranged to control an electric power switching device at the opposite end.

3. The LED tube as claimed in claim 2, wherein the safety unit further comprises:

a first optical link arranged to transfer a voltage measurement or a switching control signal optically from the first end of the LED tube to the opposite second end; and
a second optical link arranged to transfer a voltage measurement or a switching control signal optically from the second end of the LED tube to the opposite first end.

4. The LED tube as claimed in claim 2, wherein the safety unit is arranged to detect the heating voltage received from the tube holder of the fluorescent tube lighting fixture to the contact pins at each end of the LED tube.

5. The LED tube as claimed in claim 2, wherein the LED tube comprises two contact pins at each end of the tube; and between the two contact pins, a resistive, inductive or capacitive measuring component is connected at each end of the LED tube to generate a current path between the contact pins; and the safety unit is arranged to detect the low voltage over said measuring component at each end of the LED tube, the low voltage resulting from a current which passes through the measuring component and is generated in the ballast-starter circuit in the fluorescent tube lighting fixture by a high-resistance component connected in place of or in parallel with a starter.

6. The LED tube as claimed in claim 1, wherein the electric power is cross-connected in such a way that the electric power received from one end of the LED tube is supplied to the current control unit and to the LED components at the opposite end.

7. The LED tube as claimed in claim 1, wherein the safety unit further comprises:
the first controlled switching device arranged to switch electric power from said at least one contact pin of the LED tube at the first end of the LED tube to the current control unit and to the one or more LED components, to a circuit node which is at the opposite second end of the LED tube; and
the second controlled switching device arranged to switch electric power from said at least one contact pin of the LED tube at the second end of the LED tube to the current control unit and to the one or more LED components, to a circuit node which is at the opposite first end of the LED tube.

8. The LED tube as claimed in claim 7, wherein said first controlled switching device is positioned at the second end of the LED tube and connected on a supply line to receive electric power from said at least one contact pin from the opposite first end of the LED tube, whereby the voltage detection at the second end of the LED tube is arranged to control the first switching device; and said second controlled switching device is positioned at the first end of the LED tube and connected on a supply line to receive electric power from said at least one contact pin from the opposite second end of the LED tube, whereby the voltage detection at the first end of the LED tube is arranged to control the second switching device.

9. The LED tube as claimed in claim 1, wherein detected voltages, heating voltages or low voltages are directly connected to serve as control voltages of the first and second switching devices.

10. The LED tube as claimed in claim 1, wherein a part of the tube casing of the LED tube lighting fixture is made of metal or comprises a metal structure for providing cooling.

11. A LED tube comprising:
a substantially fluorescent-tube-shaped and fluorescent-tube-sized translucent or fluorescent tube having one or more LED components and a current control unit installed therein, both ends of the LED tube being provided with at least one contact pin for connecting the LED tube mechanically and electrically to tube holders of a fluorescent tube lighting fixture, wherein the supply of electric power is cross-connected between the ends of the LED tube; and
a safety unit, the safety unit comprising:
a first conductor line arranged to transfer a voltage measurement or a switching control signal from the first end of the LED tube to the opposite second end; and
a second conductor line arranged to transfer a voltage measurement or a switching control signal from the second end of the LED tube to the opposite first end.

12. A lighting fixture arrangement, comprising:
a lighting fixture which is designed for a fluorescent tube and in which a LED tube is installed, the LED tube comprising:
a substantially fluorescent-tube-shaped and fluorescent-tube-sized translucent or fluorescent tube having one or more LED components and a current control unit installed therein, both ends of the LED tube being provided with at least one contact pin for connecting the LED tube mechanically and electrically to tube holders of a fluorescent tube lighting fixture; and
a safety unit arranged to switch electric power from the ends of the LED tube to the current control unit and LED components separately only after a voltage fed from the corresponding tube holder of the lighting fixture to said at least one contact pin has been detected at each end of the LED tube separately, and the supply of electric power or the control of the switching of electric power is cross-connected between the ends of the LED tube,
wherein the safety unit comprises:
a first and a second controlled switching device at a first and at a second end of the LED tube, respectively, configured to supply electric power to the current control unit and to the one or more LED components;
a first voltage detector connected to detect the voltage from said at least one contact pin at the first end of the LED tube, and connected to control said second switching device at the opposite second end of the LED tube; and
a second voltage detector connected to detect the voltage from said at least one contact pin at the second end of the LED tube, and connected to control said first switching device at the opposite first end of the LED tube.

13. The lighting fixture arrangement as claimed in claim 12, wherein the lighting fixture comprises a high-frequency electronic ballast.

14. A lighting fixture arrangement, comprising:
a lighting fixture which is designed for a fluorescent tube and in which a LED tube is installed, the LED tube comprising:
a substantially fluorescent-tube-shaped and fluorescent-tube-sized translucent or fluorescent tube having one or more LED components and a current control unit installed therein, both ends of the LED tube being provided with at least one contact pin for connecting the LED tube mechanically and electrically to tube holders of a fluorescent tube lighting fixture, wherein the supply of electric power is cross-connected between the ends of the LED tube; and
a safety unit, the safety unit comprising:
a first conductor line arranged to transfer a voltage measurement or a switching control signal from the first end of the LED tube to the opposite second end; and
a second conductor line arranged to transfer a voltage measurement or a switching control signal from the second end of the LED tube to the opposite first end.

* * * * *